United States Patent [19]
Suga et al.

[11] Patent Number: 5,770,314
[45] Date of Patent: Jun. 23, 1998

[54] TRANSPARENT ELECTRICALLY CONDUCTIVE PLATE

[75] Inventors: Masanobu Suga; Tsuyoshi Asano; Nobuyuki Kuroda, all of Yokohama, Japan

[73] Assignee: Nippon Oil Co., Ltd., Tokyo, Japan

[21] Appl. No.: 625,173

[22] Filed: Mar. 29, 1996

[30] Foreign Application Priority Data

Apr. 4, 1905 [JP] Japan .................................. 7-078554

[51] Int. Cl.⁶ .................................................. B32B 27/36
[52] U.S. Cl. ...................... 428/412; 428/413; 428/421; 428/457; 428/458; 428/447; 428/480; 428/501; 428/502; 428/506; 428/522; 428/473.5; 428/477.4; 428/624
[58] Field of Search .................................. 428/412, 413, 428/421, 457, 458, 447, 480, 501, 502, 506, 522, 473.5, 477.4, 624

[56] References Cited

U.S. PATENT DOCUMENTS 5,251,064 10/1993 Tennant .................................. 359/361

*Primary Examiner*—Leszek Kiliman
*Attorney, Agent, or Firm*—Darby & Darby

[57] ABSTRACT

A transparent electrically conductive plate contains a transparent substrate, a transparent electrically conductive layer, an ultraviolet absorbing layer disposed between the transparent substrate and the transparent electrically conductive layer and containing an organic ultraviolet absorber, and an overcoating layer disposed between the transparent electrically conductive layer and the ultraviolet absorbing layer for protecting the ultraviolet absorbing layer.

17 Claims, 2 Drawing Sheets

TRANSPARENT ELECTRICALLY CONDUCTIVE PLATE

BACKGROUND OF THE INVENTION

This invention relates to a transparent electrically conductive plate exhibiting ultraviolet shielding performance useful for a variety of electronic devices.

The electronic devices employing liquid crystal or electrochromic material are deteriorated by irradiation with ultraviolet rays. If an ultraviolet shielding layer is provided below the transparent electrically conductive layer for prohibiting such deterioration, the abrasion resistance, for example of the glass of the electronic device is not lowered. However, high vacuum and high temperature are required for fabrication of the transparent electrically conductive layer, such as ITO. An ultraviolet absorbing layer containing an organic ultraviolet absorber alone cannot withstand these conditions, such that sufficient performance cannot be achieved due to volatilization of the organic ultraviolet absorber.

For overcoming these inconveniences, attempts have been made for providing an ultraviolet absorbing layer outside of the device and providing a glass layer on the ultraviolet absorbing layer as disclosed in, for example Japanese Laid-open Patent Publication No. 1-276120 (1989). However, this complicates the structure and increases the number of process steps. Although attempts have also been made in providing a dichroic layer as shown in Japanese Laid-open Patent Publication No. 63-236016 (1988), this structure leads to elevated production costs. Although attempts have also been made in providing an ultraviolet absorbing layer containing metal oxides as shown in Japanese Laid-open Patent Publication No. 62-148339 (1987), the near-ultraviolet area cannot be shielded satisfactorily.

SUMMARY OF THE INVENTION

It is therefore an object of the present invention to provide a transparent electrically conductive plate having high electrical conductivity and superior ultraviolet shielding performance despite its simpler structure and low production costs.

The above and other objects of the invention will become apparent from the following description.

According to the present invention, there is provided a transparent electrically conductive plate including a transparent substrate, a transparent electrically conductive layer, an ultraviolet absorbing layer disposed between the transparent substrate and the transparent electrically conductive layer and containing an organic ultraviolet absorber, and an overcoating layer disposed between the transparent electrically conductive layer and the ultraviolet absorbing layer for protecting the ultraviolet absorbing layer.

PREFERRED EMBODIMENTS OF THE INVENTION

The present invention will be explained in further detail hereinbelow.

The transparent electrically conductive plate according to the present invention is comprised of the transparent substrate and the transparent electrically conductive layer.

Although there is no particular limitation to the material of the transparent substrate employed for constituting the transparent electrically conductive plate, colorless or colored transparent resins may be employed in addition to a colorless or colored glass material. The resins may be enumerated by polyethylene terephthalate, polyamide, polysulfone, polyether sulfone, polyether ether ketone, polyphenylene sulfide, polycarbonate, polyimide, polymethyl methacrylate and polystyrene. For transparency in the context of the present invention, transmittance of 10% to 100% suffices. The transparent substrate in the context of the present invention is such a plate having a smooth surface at ambient temperature. The surface may be planar or curved and may be deformed under stress.

There is no particular limitation to the transparent electrically conductive layer employed for the transparent electrically conductive plate provided that the layer satisfies the requirements for transparency. For example, thin films of metals, such as gold or silver, are preferred. As the metal oxides, ITO ($In_2O_3$—$SnO_2$), tin oxide, znc oxide or vanadium oxide may be employed. The film thickness is usually 100 to 5000 Å and preferably 500 to 3000 Å. The surface resistance (resistivity), which may be selected to a suitable value depending upon the usage of the transparent electrically conductive plate, is usually 0.5 to 500 $\Omega/cm^2$ and preferably 2 to 50 $\Omega/cm^2$.

There is no particular limitation to the method for forming the transparent electrically conductive layer and any of known methods may be employed depending upon the types of the metal oxides and metals employed for the electrically conductive layer. These methods may be exemplified by a vacuum deposition method, an ion plating method or a sputtering method. In any of these methods, the electrically conductive layer may be formed at the transparent substrate temperature ranging between 100° C. and 350° C.

The transparent electrically conductive plate has an ultraviolet absorbing layer between the transparent substrate and the transparent electrically conductive layer. The ultraviolet absorbing layer may be substantially comprised of the organic ultraviolet absorber alone or in combination with a basic material. The thickness of the ultraviolet absorbing layer may usually be in a range from 1 to 100 μm.

The organic ultraviolet absorber substantially used alone for the ultraviolet absorbing layer may have reactive functional groups. For example, the organic ultraviolet absorber having a benzotriazole skeleton or the organic ultraviolet absorber having a benzophenone skeleton, may be employed. The organic ultraviolet absorber having the benzotriazole skeleton may be exemplified by 2-(2'-hydroxy-5'-methylphenyl) benzotriazole, 2-(2'-hydroxy-3',5'-bis(α,α-dimethylbenzyl) phenyl) benzotriazole, 2-(2'-hydroxy-3',5'di-t-butyl phenyl) benzotriazole, 2-(2'-hydroxy-3'-t-butyl-5'-methyl phenyl)-5-chlorobenzotriazole, octyl 3-(5-chloro-2H-benzotriazole-2-yl)-5-(1,1-dimethylethyl)-4-hydroxybenzene propanate. The organic ultraviolet absorber having the benzophenone skeleton may be exemplified by 2,4-dihydroxy benzopheneone, 2-hydroxy-4-methoxy benzophenone, 2-hydroxy-4-methoxy benzophenone-5-sulfonic acid, 2-hydroxy-4-n-octoxy benzophenone, 2,2'-dihydroxy-4,4'-dimethoxy benzophenone, 2,2',4,4'-tetrahydroxy benzophenone and 2-hydroxy-4-methoxy-2'-carboxy benzophenone. These organic ultraviolet absorbers may be used alone or as a mixture.

In the ultraviolet absorbing layer substantially constituted by the organic ultraviolet absorber and the basic material, the organic ultraviolet absorber may be dispersed in the basic material, or the organic ultraviolet absorber and the basic material may be chemically bonded partially or substantially entirely to each other.

The organic ultraviolet absorber employed in the ultraviolet absorbing layer in which the organic ultraviolet absorber is dispersed in the basic material may be the same as the aforementioned organic ultraviolet absorber. There is no limitation imposed on the type of the basic material which may be suitably selected depending on the purpose and the method for manufacture of the transparent substrate. Preferred basic materials include resins, such as polyester resin, silicone resin, acrylic resin, melamine resin, phenolic resin, polycarbonate resin, epoxy resin, polystyrene resin, polyether resin, polyamide resin, polyimide resin and fluoro resin. These may be used alone or in combination. Specifically, if the ultraviolet absorbing layer is prepared without a curing process by heating, thermoplastic resins, such as polystyrene resin are preferably employed as the basic material. However, if the vapor deposition method or the sputtering method is employed as a method for forming the transparent electrically conductive layer, it is more preferred to use a polymer having a softening point not lower than 180° C., such as polyether sulfone or polycarbonate, since usually a high temperature is involved. If the ultraviolet absorbing layer is formed through a heating and curing process, thermosetting resins, such as silicone resin or acrylic melamine resin, are preferred. If the ultraviolet absorbing layer is to be produced by photocuring, acrylic resin including cross-linking agents is preferred.

Although no limitation is imposed on the proportions of the organic ultraviolet absorber and the basic material in the ultraviolet absorbing layer having a configuration in which the organic ultraviolet absorber is dispersed in the basic material, the amount of the organic ultraviolet absorber to the sum of the amounts of the organic ultraviolet absorber and the basic material is usually not less than 5 wt % and less than 100 wt % and preferably 10 to 80 wt %. If the amount of the organic ultraviolet absorber is less than 5 wt %, sufficient ultraviolet shielding performance occasionally cannot be achieved.

In the ultraviolet absorbing layer in which the organic ultraviolet absorber and the basic material are chemically bonded partially or substantially entirely to each other, the organic ultraviolet absorber and the basic material may be chemically bonded to each other directly or via a coupling agent. The chemical bond herein means a covalent bond or an ionic bond. Examples of the covalent bond include C—C, C=C, C≡C, C—O, C—Si, C—N, C=N, C—S, C—B, C—P and C=P, while examples of the ionic bond include COO—Ca—OCO and COO—Mg—OCO. Since the vapor pressure of the organic ultraviolet absorber is substantially not induced in this configuration of the ultraviolet absorbing layer, the transparent electrically conductive layer may be produced stably under reduced pressure at an elevated temperature of 300° C. or higher. Although the bonded state can be confirmed by known analytic means, it is preferred to heat the ultraviolet absorbing layer in a suitable liquid hydrocarbon, for example an aromatic solvent, such as toluene, and to measure weight changes before and after the heating, as a simple index for the bonded state. If the basic material and the organic ultraviolet absorber are bonded to each other in their entirety, there is no substantial weight change before and after heating.

Although no limitation is imposed on a method for chemically bonding the organic ultraviolet absorber to the basic material, such bonding may easily be achieved by reacting or polymerizing, with the basic material, that is a resin of the basic material or a precursor thereof, an organic ultraviolet absorber having a group capable of reacting with a functional group contained in the basic material. Specific examples of the method include (A) a method of mixing and bonding the organic ultraviolet absorber having introduced therein a reactive functional group such as a methacryloyl group or an alkoxy silyl group, to a coating liquid containing the resin of the basic material or the precursor thereof, in a coating or curing step, (B) a method of polymerizing an organic ultraviolet absorber having polymerizable functional groups, such as an acryloyl or acryl group, with a monomer of a polymerizable basic material, and (C) a method of bonding the basic material, such as a precursor for the resin of the basic material, with an organic ultraviolet absorber using a coupling agent, such as a silane-based coupling agent. Of these, the methods (A) and (C) are preferred in that a high quality product may thereby be easily produced.

The organic ultraviolet absorber employed in the method (A) may be suitably selected depending on the basic material employed. Among preferred organic ultraviolet absorbers, there is a compound shown by the following formula:

referred to hereinafter as an organic ultraviolet absorber A. In the above formula, $R^1$ denotes a hydrogen atom, a halogen atom or an alkyl group having 1 to 10 and preferably 1 to 6 carbon atoms. Examples of the halogen atom include a fluorine atom, a chlorine atom, a bromine atom and an iodine atom, while examples of the alkyl group include a methyl group, an ethyl group, a propyl group, an isopropyl group, a butyl group, a tert.-butyl group and a cyclohexyl group.

The position of substitution of $R^1$ may be 4-position or 5-position of the benzotriazole skeleton in the formula. The halogen atom and the alkyl group having 1 to 10 carbon atoms may usually be substituted at 5-position.

$R^2$ in the formula denotes a hydrogen atom or an alkyl group having 1 to 10, preferably 1 to 6 carbon atoms. The alkyl group may be enumerated by those mentioned for $R^1$. $R^3$ and $R^4$ in the formula may be the same or different groups and denote an alkylene group having 1 to 6, preferably 1 to 3 carbon atoms. Examples of the alkylene group include a methylene group, an ethylene group and a propylene group. $R^5$ to $R^9$ may be the same or different groups and denote an alkyl group having 1 to 10 carbon atoms, preferably 1 to 6 carbon atoms, an alkoxy group having 1 to 10, preferably 1 to 6 carbon atoms, an aryl group having 6 to 10, preferably 6 to 8 carbon atoms, a hydroxyl group or a hydrogen atom. The alkyl group may be enumerated by those mentioned for $R^1$. Examples of the alkoxy group include a methoxy group, an ethoxy group, an isopropoxy group, a propoxy group, a butoxy group and a tert.-butoxy group, while examples of the aryl group include a phenyl group an a xylyl group. X denotes an amido bond (CONH), a urethane bond (OCONH) or an ester bond (COO). n denotes an integer specified by $n \geq 0$ and preferably $0 \geq n \leq 20$.

The compound represented by the above formula may be enumerated by 3-(5-methyl-2H-benzotriazole-2-yl)-5-methyl-4-hydroxy-N-(2-(trimethoxy silyl) ethyl)-benzene propane amido, 3-(5-ethyl-2H-benzotriazole-2-yl)-4-hydroxy-N-(2-(1,1,3,3-tetramethyl disiloxy) ethyl) benzene propane amido, 3-(2H-benzotriazole-2-yl)-4-hydroxy benzene ethyl N-(3-(trimethoxy silyl) propyl) carbamate, 3-(5-chloro-2H-benzotriazole-2-yl)-4-hydroxy benzene propyl N-(2-(nonaphenyl tetrasiloxy) ethyl) carbamate, 3-(5-chloro-2H-benzotriazole-2-yl)-5-(1,1-dimethylethyl)-4-hydroxy-N-(3-(triethoxy silyl) propyl)-benzene propane amido, 3-(5-chloro-2H-benzotriazole-2-yl)-5-(1,1-dimethylethyl)-4-hydroxy-N-(3-(triethoxy silyl) propyl)-benzene propane amido, 3-(5-chloro-2H-benzotriazole-2-yl)-5-(1,1-dimethylethyl)-4-hydroxy-N-(3-(henicosamethyl decasiloxy) propyl)-benzene propane amido, 3-(2H-benzotriazole-2-yl)-4-hydroxy-N-(2-(1,1-dimethyl-trimethoxy disiloxy) ethyl)-benzene propane amido, 3-(triethoxy silyl) propyl 3-(5-chloro-2H-benzotriazole-2-yl)-5-(1,1-dimethylethyl)-4-hydroxy-benzene propanate, 3-(1,1,3,3,5,5,5-heptamethyl trisiloxy) propyl 3-(5-chloro-2H-benzotriazole-2-yl)-5-(1,1-dimethylethyl)-4-hydroxy-benzene propanate and 3-(diethoxymethyl silyl) propyl 3-(2H-benzotriazole-2-yl)-5-(1,1-dimethylethyl)-4-hydroxy-benzene propanate.

The organic ultraviolet absorber A may easily be produced by known methods, for example by bonding a variety of benzotriazoles with a variety of silanes. Specifically, the organic ultraviolet absorber A having a structure in which benzotriazoles and silanes are coupled to each other via an amido bond may be prepared by coupling the benzotriazoles having a carboxyl group with silanes having an amino group. The organic ultraviolet absorber A having a structure in which benzotriazoles and silanes are coupled to each other via a urethane bond may be prepared by coupling the benzotriazoles having a hydroxyl group with silanes having an isocyanate group. On the other hand, the organic ultraviolet absorber A having a structure in which benzotriazoles and silanes are coupled to each other via an ester bond may be prepared by addition to a silane having a hydrosilyl group of a compound having a benzotriazole and an unsaturated hydrocarbon bonded to each other by an ester bond.

The precursor for the resin of the basic material to be bonded to the organic ultraviolet absorber A may be enumerated by reactive monomers such as methacrylic monomers or alkoxy silanes and reactive oligomers, such as acrylic oligomers or silicone oligomers.

Although no limitation is imposed on the basic material to be bonded to the organic ultraviolet absorber A, it may be any of those specified above as the basic material for constituting the ultraviolet absorbing layer in which the organic ultraviolet absorber is dispersed in the basic material.

The combination of the organic ultraviolet absorber A with the precursor for the resin of the basic material produced by the method (A), may further be mixed with other basic materials. Although no limitation is imposed on the other basic materials, they may be the same materials as those bonded to the organic ultraviolet absorber A.

The preferred combination of the organic ultraviolet absorber with the coupling agent in the above method (C) may be enumerated by a combination (C-a) of the organic ultraviolet absorber of carboxylic acids and a coupling agent of aminosilanes, a combination (C-b) of an organic ultraviolet absorber of alcohols and a coupling agent of isocyanate silanes, and a combination (C-c) of an organic ultraviolet absorber of esters with a coupling agent of silanes.

The organic ultraviolet absorber of carboxylic acid in the combination (C-a) may be enumerated by carboxylic acids represented by the formula:

wherein $R^1$, $R^2$ and $R^3$ have the same meaning as those for the organic ultraviolet absorber A.

The carboxylic acids having the above formula may be enumerated by 3-(5-chloro-2H-benzotriazole-2-yl)-5-(1,1-dimethylethyl)-4-hydroxy-benzene propanoic acid, 3-(2H-benzotriazole-2-yl)-4-hydroxy-benzene ethanoic acid and 3-(5-methyl-2H-benzotriazole-2-yl)-5-(1-methylethyl)-4-hydroxy benzene propanoic acid.

The coupling agent of aminosilanes in the combination (C-a) may be enumerated by aminosilanes having the formula:

where $R^4$ to $R^9$ and n have the same meaning as those of the above organic ultraviolet absorber A.

The aminosilanes represented by the above formula may be enumerated by 3-aminopropyl triethoxy silane, 3-aminopropyl diisopropyl ethoxy silane, 3-aminopropyl methyl diethoxy silane, 3-aminopropyl polydimethyl siloxane, 3-aminopropyl trimethoxy silane and 3-aminopropyl tris(methoxy ethoxy ethoxy silane).

The organic ultraviolet absorber of alcohols in the combination (C-b) may be enumerated by alcohols having the formula:

where $R^1$, $R^2$ and $R^3$ have the same meaning as those of the above organic ultraviolet absorber A.

Examples of the alcohols include 3-(5-chloro-2H-benzotriazole-2-yl)-5-(1,1-dimethylethyl)-4-hydroxy-benzene propanol, 3-(2H-benzotriazole-2-yl)-4-hydroxy-benzene ethanol, 3-(5-methyl-2H-benzotriazole-2-yl)-5-(1-methylethyl)-4-hydroxy-benzene propanol.

The coupling agent of isocyanate silanes in the combination (C-b) may be enumerated by isocyanate silanes having the formula:

where $R^4$ to $R^9$ and n have the same meaning as those of the above organic ultraviolet absorber A.

Examples of the isocyanate silanes having the above formula include 3-isocyanate propyl triethoxy silane, 3-isocyanate propyl methoxy dimethyl silane and 2-isocyanate ethyl polydimethyl siloxane.

The organic ultraviolet absorber of esters in the combination (C-c) may be enumerated by esters having the formula:

where $R^1$, $R^2$ and $R^3$ have the same meaning as those of the above organic ultraviolet absorber A, $R^{10}$ denotes a C1 to C10 hydrocarbon group having an unsaturated double bond, and specifically, $R^{10}$ becomes identical with $R^4$ of the organic ultraviolet absorber A by addition reaction.

Examples of the esters having the above formula include 2-propenyl 3-(5-chloro-2H-benzotriazole-2-yl)-5-(1,1-dimethylethyl)-4-hydroxy-benzene propanate, vinyl 3-(2H-benzotriazole-2-yl)-4-hydroxy-benzene ethanate, and 3-methyl-3-butenyl 3-(5-methyl-2H-benzotriazole-2-yl)-5-(1-methylethyl)-4-hydroxy-benzene propanate.

The coupling agent of silanes in the combination (C-c) may be enumerated by silanes having the formula:

where $R^5$ to $R^9$ and n have the same meaning as those of the above organic ultraviolet absorber A.

Examples of the silanes having the above formula may be enumerated by triethoxy silane, diisopropyl ethoxy silane, methyl diethoxy silane and polymethyl siloxane.

The basic materials enumerated in the above method (A) may be used as the basic materials enumerated in the above method (C).

There is no limitation to the method for forming the ultraviolet absorbing layer and any of known methods may be selectively employed. Specifically, the ultraviolet absorbing layer containing the organic ultraviolet absorber may be produced by coating a solution of the organic ultraviolet absorber; a solution containing the organic ultraviolet absorber and the resin of the basic material or the precursor thereof or a fused mass thereof; or a solution containing the organic ultraviolet absorber, the resin of the basic material or the precursor thereof and a coupling agent or a fused mass thereof, and by performing necessary processing operations after such coating. The coating methods may usually be selected from spin coating, spray coating, cast coating and blade coating depending on the purpose. The processing operations after coating usually consist in curing by heating. However, curing by allowing to stand at room temperature and/or by light irradiation may be suitably employed depending upon the properties of the resin. The method of heat curing includes heating on a hot plate or in an oven. The heating temperature is usually 50° to 400° C. The method of photocuring includes irradiation by a high-pressure mercury lamp, a low-pressure mercury lamp, a fluorescent tube or a xenon lamp with ultraviolet rays or visible light usually for 5 seconds to 24 hours.

The transparent electrically conductive plate according to the present invention includes an overcoating layer between the ultraviolet absorbing layer and the transparent electrically conductive layer. The overcoating layer is intended for protecting the ultraviolet absorbing layer and for enabling stable formation of the transparent electrically conductive layer. Usually, a resin having superior thermal resistance is preferably employed as the overcoating layer. Examples of these resins include polyimide, polyamide, polycarbonate, polyallylate, polyether sulfone, melamine resin, phenolic resin, epoxy resin, silicone resin, such as silicone varnish, and urea resin. The silicone resin, such as silicone varnish, are most preferred. These resins may be used alone or in combination. Glass fillers or inorganic powders may be contained in these resins. As the inorganic powders, powders of $ZnO$, $TiO_2$, $CeO_2$ or silica may be employed.

Although there is no limitation to the method for forming the overcoating layer, a method consisting in coating a solution of a resin for forming the overcoating layer or a solution of a precursor for the resin is preferred. The overcoating layer may be produced by carrying out necessary processing operations depending upon the properties of the respective resins after coating. It is also possible to apply a film formed of the above resins.

If, in the method for forming the overcoating layer, a silicone varnish, for example is employed, it is possible to add a catalyst, such as dibutyltin laurate, into the silicone varnish and to effect heat curing at 100° to 200° C. for 5 minutes to two hours after coating. This method gives an overcoating of 1 to 20 μm in thickness. If the acrylic melamine resin precursor is employed, heat curing may be effected at 130° to 190° C. for five minutes to two hours after coating. This method gives an overcoating layer of 10 to 100 μm in thickness. If a photocuring type acrylic resin precursor is employed, the coated product is irradiated with light of a high-pressure mercury lamp. This method gives an overcoating layer of 1 to 10 μm in thickness by the irradiation with the high-pressure mercury lamp within five minutes.

The overcoating layer may be formed by known methods, such as spin coating, spray coating, cast coating, blade coating or dip coating.

The transparent electrically conductive plate includes the above-mentioned transparent substrate, the ultraviolet absorbing layer and the overcoating layer. The illustrative configuration of the transparent electrically conductive plate is explained in further detail with reference to the drawings.

Figure 1:
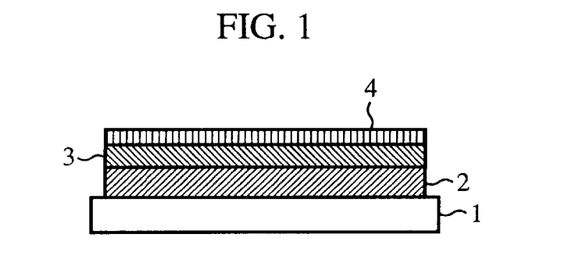
FIG. 1 is a schematic cross-sectional view showing the structure of a transparent electrically conductive plate according to the present invention.

The simplest configuration of the transparent electrically conductive plate according to the present invention includes a transparent substrate 1, an ultraviolet absorbing layer 2, an overcoating layer 3 and a transparent electrically conductive layer 4, in this order, as shown in FIG. 1.

Figure 2:
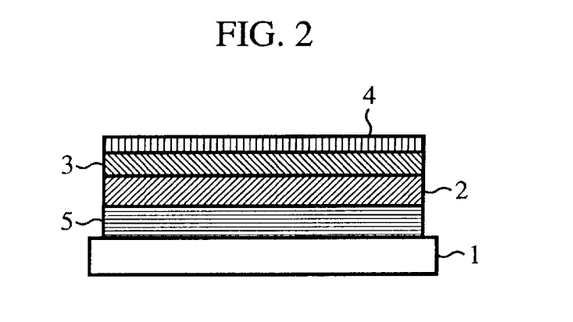
FIG. 2 is a schematic cross-sectional view showing the structure of another transparent electrically conductive plate according to the present invention.

One or more intermediate layers 5 may also be provided between the transparent substrate 1 and the ultraviolet absorbing layer 2, as shown in FIG. 2. Although there is no limitation to the function of the intermediate layer 5, the ultraviolet absorbing layer containing inorganic oxides, such as $ZnO$, $CeO_2$ or $TiO_2$, may be provided for suppressing deterioration of the organic ultraviolet absorber due to far ultraviolet rays. The intermediate layer containing a silane coupling agent or a surfactant may also be provided for improving adhesion between the transparent substrate 1 and the ultraviolet absorbing layer 2.

Figure 3:
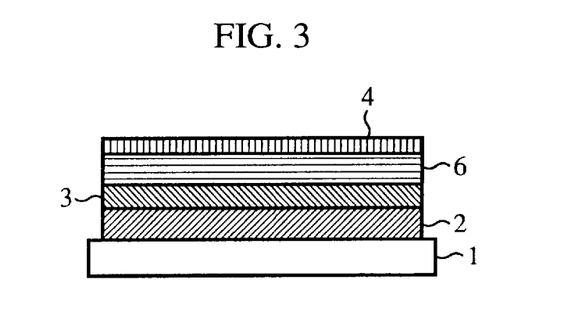
FIG. 3 is a schematic cross-sectional view showing the structure of still another transparent electrically conductive plate according to the present invention.

One or more intermediate layers 6 may also be provided between the overcoating layer 3 and the transparent electrically conductive layer 4, as shown in FIG. 3. Although there is no limitation to the function of the intermediate layer 6, silane coupling agents or surfactants may also be contained in the intermediate layer 6 for improving adhesion between the overcoating layer 3 and the transparent electrically conductive layer 4.

Figure 4:
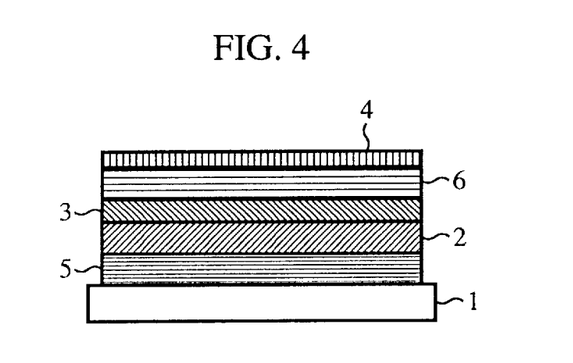
FIG. 4 is a schematic cross-sectional view showing the structure of yet another transparent electrically conductive plate according to the present invention.

One or more intermediate layers 5, 6 may also be provided between the transparent substrate 1 and the ultraviolet absorbing layer 2 and between the overcoating layer 3 and the transparent electrically conductive layer 4, respectively, as shown in FIG. 4. Although there is no limitation to the function of the intermediate layers 5, 6, the functions similar to those explained in connection with FIGS. 2 and 3 may be accorded to the layers 5, 6.

The above-described layer structure may be provided not only on one surface but also on both surfaces of the transparent electrically conductive plate.

The transparent electrically conductive plate according to the present invention has high electrical conductivity and superior ultraviolet shielding effect. In particular, if the ultraviolet absorbing layer is selected suitably, the wavelength of 400 nm or less can be shielded very sharply. In addition, the transparent electrically conductive layer can be formed easily under the effect of the ultraviolet absorbing layer and the overcoating layer provided between the transparent substrate and the transparent electrically conductive layer, while an electronic device produced using the transparent electrically conductive plate may be protected against ultraviolet rays. If the ultraviolet absorbing layer is such a layer in which the organic ultraviolet absorber is chemically bonded to the basic material, the ultraviolet absorbing layer remains stabilized even during formation of the transparent electrically conductive layer, thus allowing to produce easily the transparent electrically conductive plate having the ultraviolet absorbing layer.

Since the transparent electrically conductive plate of the present invention has the above features and, in addition, has a simplified structure so that it can be supplied inexpensively, it is highly useful as a liquid crystal element for display or as an electrochromic element aimed at light transmission control.

EXAMPLES OF THE INVENTION

The present invention is now explained with reference to Examples which are merely illustrative and are not intended for limiting the invention.

Example 1

To a mixture of 1.89 g of an acrylic solution, manufactured by TOAGOSEI CHEMICAL INDUSTRY CO., LTD. under a trade name of S-4030 and 0.63 g of a melamine solution manufactured by SANWA CHEMICAL CO., LTD. under the trade name of MX-470, were added 9.18 g of 2-propanol and 0.80 g of octyl 3-(5-chloro-2H-benzotriazole-2-yl)-5-(1,1-dimethylethyl)-4-hydroxy-benzene propanate manufactured by CIBA GEIGY INC. under the trade name of TINUVIN 109, to provide a coating solution. Using a 10 mil applicator, the coating solution was coated on a polycarbonate substrate by a doctor blade method. The resulting product was dried on a hot plate at 60° C. for 30 minutes and cured by heating at 170° C. for two hours in a heating oven for forming an ultraviolet absorbing layer containing an acrylic melamine resin with a thickness of 70 μm on the polycarbonate substrate.

Figure 5:
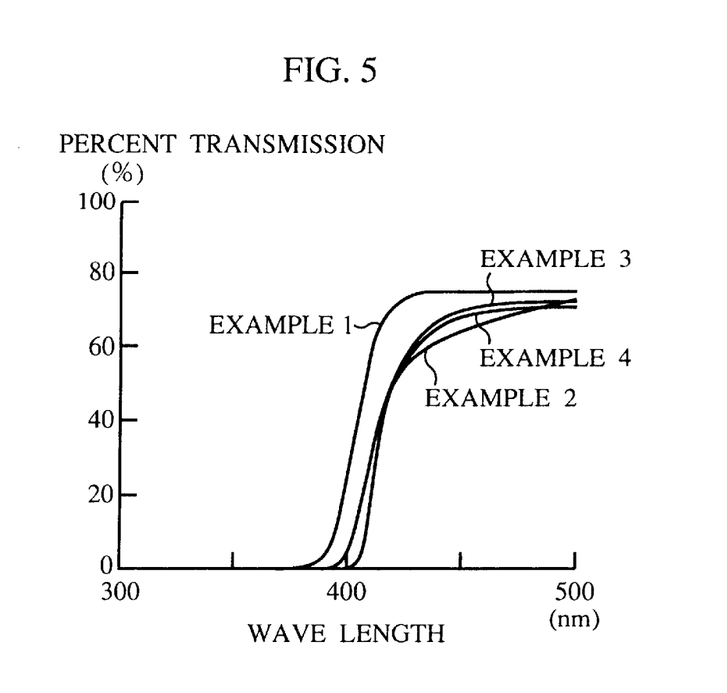
FIG. 5 is a graph showing spectral transmittance for each of Examples 1 to 4.

Then, a silicone resin coating solution manufactured by NIPPON UNICAR COMPANY LTD. diluted twice the original volume by ethanol, was spray-coated on the ultraviolet absorbing layer. After drying the solvent, the resulting layer was cured by heating at 100° C. for 20 minutes for forming an overcoating layer of a silicone resin about 6.5 μm thick on the ultraviolet absorbing layer. Then, ITO was formed on the overcoating layer by sputtering at the substrate temperature of 200° C. for forming a transparent electrically conductive layer with an electrical resistivity of 8.2 $\Omega/cm^2$ to have a layer thickness of about 3900 Å for producing a transparent electrically conductive plate having the ultraviolet absorbing layer. FIG. 5 shows spectral transmittance of the transparent electrically conductive plate.

Example 2

To 11.1 ml of silicone varnish manufactured by OKITSUMO CO. under the trade name of XO-7931-CLEAR, were added 5 g of 3-(5-chloro-2H-benzotriazole-2-yl)-5-(1,1-dimethylethyl)-4-hydroxy-N-(3-(triethoxy silyl) propyl) benzene propane amido. To the resulting mass were added 1 ml of water, 0.1 ml of acetic acid and 10 μl of di-n-butyltin dilaurate. The resulting product was allowed to stand at 60° C. for 24 hours and the resulting silicone varnish coating solution was spray-coated on a glass substrate. The resulting product was dried on a hot plate at 60° C. for 15 minutes and cured by heating in an oven at 200° C. for one hour for forming an ultraviolet absorbing layer about 15 μm thick on the glass substrate. No components of the ultraviolet absorbing layer were seen to be eluted even in chloroform.

On the ultraviolet absorbing layer was spray-coated the diluted silicone resin coating solution prepared in Example 1. The resulting product was dried and cured under heating in a similar manner to Example 1 for forming an overcoating layer of about 6.5 μm in thickness on the ultraviolet absorbing layer.

Then, ITO was formed on the overcoating layer by sputtering at the substrate temperature of 250° C. for forming a transparent electrically conductive layer with an electrical resistivity of 7.5 $\Omega/cm^2$ to have a layer thickness of about 3900 Å for producing a transparent electrically conductive plate having the ultraviolet absorbing layer. FIG. 5 shows spectral transmittance of the transparent electrically conductive plate.

2.0 g of the layers thus formed were then collected by scraping from the glass substrate. The collected material as a sample was subjected to Soxhlet extraction for 12 hours using 200 ml of toluene. A residual material was vacuum-dried and weighed. It was found that there was no decrease in weight.

Example 3

3.24 g (8.7 mmol) of 3-(5-chloro-2H-benzotriazole-2-yl)-5-(1,1-dimethylethyl)-4-hydroxy-benzene propanoic acid were dissolved in 15 g of dimethyl formamide (DMF) to give a solution to which were added 11.1 g of silicone varnish manufactured by OKITSUMO CO. under the trade name of XO-7931-CLEAR. To the resulting solution were added 1.92 g (8.7 mmol) of aminopropyl triethoxy silane to form a precipitate. The precipitate was dissolved by heating at 60° and admixed with 1 ml of a DMF:water:acetic acid=1:1:1 solution. The resulting solution was heated under agitation at 60° C. for two hours. The resulting mass was allowed to stand for two days in a constant temperature vessel maintained at 60° C. and spray-coated on a glass substrate. The resulting product was baked at 210° C. for one hour for forming a transparent ultraviolet absorbing layer of about 10 μm in thickness on the glass substrate.

The diluted silicone resin coating liquid prepared in Example 1, was spray-coated on the ultraviolet absorbing layer. The resulting product was dried and heated for curing as in Example 1 to form an overcoating layer of approximately 4.0 μm in thickness on the ultraviolet absorbing layer.

Then, ITO was formed on the overcoating layer by sputtering at the substrate temperature of 250° C. for forming a transparent electrically conductive layer with an electrical resistivity of 7.5 Ω/cm$^2$ to have a layer thickness of about 3300 Å for producing a transparent electrically conductive plate having the ultraviolet absorbing layer. FIG. 5 shows spectral transmittance of the transparent electrically conductive plate.

2.0 g of the layers thus formed were then collected by scraping from the glass substrate. The collected material as a sample was subjected to Soxhlet extraction for 12 hours using 200 ml of toluene. A residual solid material was vacuum-dried and weighed. It was found that there was no decrease in weight.

Example 4

An ultra-fine ZnO particle suspended coating, manufactured by RESINO COLOR INDUSTRY CO., LTD. under the trade name of UV-S-400 was applied by dip coating on a glass substrate and cured by heating at 200° C. for 20 minutes for forming a far ultraviolet absorbing layer of about 2 μm in thickness on a glass substrate. Then, a methylene chloride solution of polyether sulfone manufactured by ICI LTD. under the trade name of VICTREX PES4100P, was coated on the resulting product for forming a polymer layer of about 2 μm in thickness on the far ultraviolet absorbing layer. On the polymer layer was further coated the silicone varnish coating solution similar to that in Example 2 to form an ultraviolet absorbing layer of about 15 μm in thickness comprised of the far ultraviolet absorbing layer, the polymer layer and the silicone varnish layer.

Then, polyimide varnish manufactured by NISSAN CHEMICAL INDUSTRIES, LTD. under the trade name of RN-812, was spin-coated on the ultraviolet absorbing layer. The solvent was then dried off at 60° C. on a hot plate and the resulting product was cured under heating in an oven at 200° C. for 30 minutes for forming an overcoating layer of about 2 μm in thickness on the ultraviolet absorbing layer.

Then, ITO was formed on the overcoating layer by sputtering at the substrate temperature of not higher than 250° C. for forming a transparent electrically conductive layer with an electrical resistivity of 9.5 Ω/cm$^2$ to have a layer thickness of 2050 Å for producing a transparent electrically conductive plate having the ultraviolet absorbing layer. FIG. 5 shows spectral transmittance of the transparent electrically conductive plate.

Comparative Example 1

It was tried to form a transparent electrically conductive layer of ITO on the ultraviolet absorbing layer containing acrylic melamine resin formed in Example 1 by sputtering. However, the pressure could not be lowered below 6×10$^{-4}$ torr, such that the transparent electrically conductive layer of ITO could not be formed.

Comparative Example 2

Figure 6:
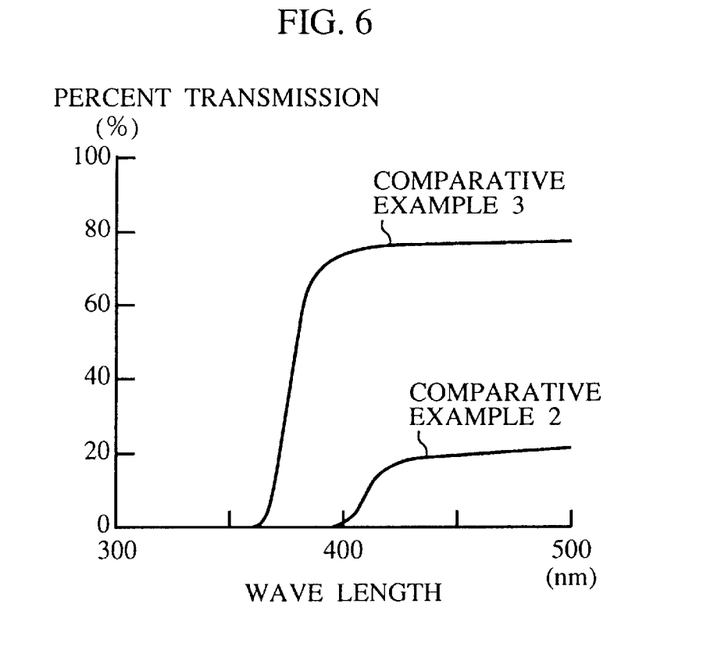
FIG. 6 is a graph showing spectral transmittance for each of comparative Examples 2 and 3.

A transparent electrically conductive plate was produced in the same way as in Example 2 except forming a transparent electrically conductive layer of ITO by sputtering without forming an overcoating layer on the ultraviolet absorbing layer containing silicone as the basic material formed in Example 2. The transparent electrically conductive plate suffered from significantly decreased visible light transmittance. FIG. 6 shows spectral transmittance of the transparent electrically conductive plate.

Comparative Example 3

Using the ultra-fine ZnO particle suspended coating employed in Example 4, an ultraviolet absorbing layer was formed on a glass substrate to have a thickness of approximately 2 μm. FIG. 6 shows spectral transmittance of the transparent electrically conductive plate.

Comparative Example 4

To 11.1 ml of the silicone varnish employed in Example 2 was added 0.95 g of octyl 3-(5-chloro-2H-benzotriazole-2-yl)-5-(1,1-dimethylethyl)-4-hydroxy-benzene propanate. To the resulting mass were added 0.2 ml of water, 0.1 ml of acetic acid and 10 μl of di-n-butyltin dilaurate. The resulting solution was allowed to stand at 60° C. for 24 hours and subsequently spray-coated on the glass substrate. After drying on a hot plate at 60° C. for 15 minutes, the resulting product was cured under heating in an oven at 200° C. for one hour to produce an ultraviolet absorbing layer of about 15 μm in thickness.

2.0 g of the ultraviolet absorbing layer thus formed were then collected by scraping from the glass substrate. The collected material as a sample was subjected to Soxhlet extraction in a similar manner to Example 2. A residual solid material was dried and weighed. It was found that there was 15.2% decrease in weight.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A transparent electrically conductive plate comprising a transparent substrate of glass material, a transparent electrically conductive layer, an ultraviolet absorbing layer including an organic ultraviolet absorber and a basic material with the ultraviolet absorber being chemically bonded to the basic material disposed between the transparent substrate and the transparent electrically conductive layer, and an overcoating layer disposed between the transparent electrically conductive layer and said ultraviolet absorbing layer for protecting the ultraviolet absorbing layer.

2. The transparent electrically conductive plate according to claim 1 wherein an intermediate layer for protecting said ultraviolet absorbing layer is provided between said transparent substrate and said ultraviolet absorbing layer.

3. The transparent electrically conductive plate according to claim 1 wherein an intermediate layer for improving adhesion of said transparent substrate and said ultraviolet absorbing layer is provided between said transparent substrate and said ultraviolet absorbing layer.

4. The transparent electrically conductive plate according to claim 1, 2 or 3 wherein an intermediate layer for improving adhesion of said overcoating layer and said transparent electrically conductive layer is provided between said overcoating layer and said transparent electrically conductive layer.

5. The transparent electrically conductive plate according to claim 1 wherein said organic ultraviolet absorber is represented by the formula:

wherein $R^1$ denotes a hydrogen atom, a halogen atom or an alkyl group having 1 to 10 carbon atoms, $R^2$ denotes a hydrogen atom or an alkyl group having 1 to 10 carbon atoms, $R^3$ and $R^4$ denote the same or different groups and denote an alkylene group having 1 to 6 carbon atoms, $R^5$ to $R^9$ denote the same or different groups and denote an alkyl group having 1 to 10 carbon atoms, an alkoxy group having 1 to 10 carbon atoms, an aryl group having 6 to 10 carbon atoms, a hydroxyl group or a hydrogen atom, X denotes an amido bond (CONH), a urethane bond (OCONH) or an ester bond (COO), and n is an integer of $n \geq 0$.

6. The transparent electrically conductive plate according to claim 5 wherein said organic ultraviolet absorber is selected from the group consisting of 3-(5-methyl-2H-benzotriazole-2-yl)-5-methyl-4-hydroxy-N-(2-(trimethoxy silyl) ethyl)-benzene propane amido, 3-(5-ethy-2H-benzotriazole-2-yl)-4-hydroxy-N-(2-(1,1,3,3-tetramethyl disiloxy) ethyl) benzene propane amido, 3-(2H-benzotriazole-2-yl)-4-hydroxy benzene ethyl N-(3-(trimethoxy silyl) propyl) carbamate, 3-(5-chloro-2H-benzotriazole-2-yl)-4-hydroxy benzene propyl N-(2-(nonaphenyl tetrasiloxy) ethyl) carbamate, 3-(5-chloro-2H-benzotriazole-2-yl)-5-(1,1-dimethylethyl)-4-hydroxy-N-(3-(triethoxy silyl) propyl)benzene propane amido, 3-(5-chloro-2H-benzotriazole-2-yl)-5-(1,1-dimethylethyl)-4-hydroxy-N-(3-(triethoxy silyl) propyl)benzene propane amido, 3-(5-chloro-2H-benzotriazole-2-yl)-5-(1,1-dimethylethyl)-4-hydroxy-N-(3-(henicosamethyl decasiloxy) propyl)-benzene propane amido, 3-(2H-benzotriazole-2-yl)-4-hydroxy-N-(2-(1,1-dimethyl-trimethoxy disiloxy) ethyl)-benzene propane amido, 3-(triethoxy silyl) propyl 3-(5-chloro-2H-benzotriazole-2-yl)-5-(1,1-dimethylethyl)-4-hydroxy-benzene propanate, 3-(1,1,3,3,5,5,5-heptamethyl trisiloxy) propyl 3-(5-chloro-2H-benzotriazole-2-yl)-5-(1,1-dimethylethyl)-4-hydroxy-benzene propanate and 3-(diethoxy methyl silyl) propyl 3-(2H-benzotriazole-2-yl)-5-(1,1-dimethylethyl)-4-hydroxy-benzene propanate.

7. The transparent electrically conductive plate according to claim 1 wherein said basic material is selected from the group consisting of polyester resin, silicone resin, acrylic resin, melamine resin, phenolic resin, polycarbonate resin, epoxy resin, polystyrene resin, polyether resin, polyamide resin, polyimide resin, fluoro resin and mixtures thereof.

8. The transparent electrically conductive plate according to claim 1 wherein said ultraviolet absorbing layer includes an organic ultraviolet absorber, a coupling agent and a basic material and wherein the organic ultraviolet absorber is chemically bonded to the basic material via said coupling agent.

9. The transparent electrically conductive plate according to claim 8 wherein said ultraviolet absorber is represented by the formula:

wherein $R^1$ denotes a hydrogen atom, a halogen atom or an alkyl group having 1 to 10 carbon atoms, $R^2$ denotes a hydrogen atom or an alkyl group having 1 to 10 carbon atoms, and $R^3$ denotes an alkylene group having 1 to 6 carbon atoms and said coupling agent is represented by the formula:

wherein $R^4$ denotes an alkylene group having 1 to 6 carbon atoms, $R^5$ to $R^9$ denote the same or different groups and denote an alkyl group having 1 to 10 carbon atoms, an alkoxy group having 1 to 10 carbon atoms, an aryl group having 6 to 10 carbon atoms, a hydroxyl group or a hydrogen atom, and n is an integer of $n \geq 0$.

10. The transparent electrically conductive plate according to claim 9 wherein said ultraviolet absorber is selected from the group consisting of 3-(5-chloro-2H-benzotriazole-2-yl)-5-(1,1-dimethylethyl)-4-hydroxy-benzene propanoic acid, 3-(2H-benzotriazole-2-yl)-4-hydroxy-benzene ethanoic acid and 3-(5-methyl-2H-benzotriazole-2-yl)-5-(1-methylethyl)-4-hydroxy-benzene propanoic acid, and said coupling agent is selected from the group consisting of 3-aminopropyl triethoxy silane, 3-aminopropyl diisopropyl ethoxy silane, 3-aminopropyl methyl diethoxy silane, 3-aminopropyl polydimethyl siloxane, 3-aminopropyl trimethoxy silane and 3-aminopropyl tris(methoxy ethoxy ethoxy) silane.

11. The transparent electrically conductive plate according to claim 8 wherein said ultraviolet absorber is represented by the formula:

wherein $R^1$ denotes a hydrogen atom, a halogen atom or an alkyl group having 1 to 10 carbon atoms, $R^2$ denotes a hydrogen atom or an alkyl group having 1 to 10 carbon atoms, and $R^3$ denotes an alkylene group having 1 to 6 carbon atoms and said coupling agent is represented by the formula:

wherein $R^4$ denotes an alkylene group having 1 to 6 carbon atoms, $R^5$ to $R^9$ denote the same or different groups and denote an alkyl group having 1 to 10 carbon atoms, an alkoxy group having 1 to 10 carbon atoms, an aryl group having 6 to 10 carbon atoms, a hydroxyl group or a hydrogen atom, and n is an integer of $n \geq 0$.

12. The transparent electrically conductive plate according to claim 11 wherein said ultraviolet absorber is selected from the group consisting of 3-(5-chloro-2H-benzotriazole-2-yl)-5-(1,1-dimethylethyl)-4-hydroxy-benzene propanol, 3-(2H-benzotriazole-2-yl)-4-hydroxy-benzene ethanol and 3-(5-methyl-2H-benzotriazole-2-yl)-5-(1-methylethyl)-4-hydroxy-benzene propanol, and said coupling agent is selected from the group consisting of 3-isocyanate propyl triethoxy silane, 3-isocyanate propyl methoxy dimethyl silane and 2-isocyanate ethyl polydimethyl siloxane.

13. The transparent electrically conductive plate according to claim 8 wherein said ultraviolet absorber is represented by the formula:

wherein $R^1$ denotes a hydrogen atom, a halogen atom or an alkyl group having 1 to 10 carbon atoms, $R^2$ denotes a hydrogen atom or an alkyl group having 1 to 10 carbon atoms, $R^3$ denotes an alkylene group having 1 to 6 carbon atoms and $R^{10}$ denotes a hydrocarbon group having 1 to 10 carbon atoms and containing an unsaturated double bond, and said coupling agent is represented by the formula:

wherein $R^5$ to $R^9$ denote the same or different groups and denote an alkyl group having 1 to 10 carbon atoms, an alkoxy group having 1 to 10 carbon atoms, an aryl group having 6 to 10 carbon atoms, a hydroxyl group or a hydrogen atom, and n is an integer of $n \geq 0$.

14. The transparent electrically conductive plate according to claim 13 wherein said ultraviolet absorber is selected from the group consisting of 2-propenyl 3-(5-chloro-2H-benzotriazole-2-yl)-5-(1,1-dimethylethyl)-4-hydroxy benzene propanate, vinyl 3-(2H-benzotriazole-2-yl)-4-hydroxy-benzene ethanate and 3-methyl-3-butenyl 3-(5-methyl-2H-benzotriazole-2-yl)-5-(1-methylethyl)-4-hydroxy-benzene propanate, and said coupling agent is selected from the group consisting of triethoxy silane, diisopropyl ethoxy silane, methyl diethoxy silane and polymethyl siloxane.

15. The transparent electrically conductive plate according to claim 8 wherein said basic material is selected from the group consisting of polyester resin, silicone resin, acrylic resin, melamine resin, phenolic resin, polycarbonate resin, epoxy resin, polystyrene resin, polyether resin, polyamide resin, polyimide resin, fluoro resin and mixtures thereof.

16. The transparent electrically conductive plate according to claim 1 wherein said overcoating layer is formed of a resin selected from the group consisting of polyimide, polyamide, polycarbonate, polyallylate, polyether sulfone, melamine resin, phenolic resin, epoxy resin, silicone resin, urea resin and mixtures thereof.

17. The transparent electrically conductive plate as claimed in claim 1 wherein said transparent electrically conductive layer consists of metal oxide.

* * * * *

UNITED STATES PATENT AND TRADEMARK OFFICE
CERTIFICATE OF CORRECTION

PATENT NO. : 5,770,314　　　　　　　　　　　　　　　　　　　　　　　　Page 1 of 1
APPLICATION NO. : 08/625173
DATED : June 23, 1998
INVENTOR(S) : Masanobu Suga, Tsuyoshi Asano and Nobuyuki Kuroda It is certified that error appears in the above-identified patent and that said Letters Patent is hereby corrected as shown below:

Col. 13, line 31,
In Claim 6, line 2, change "5" to --1--.

Signed and Sealed this

Thirty-first Day of July, 2007

JON W. DUDAS
*Director of the United States Patent and Trademark Office*